United States Patent [19]
Ahlberg et al.

[11] Patent Number: 5,600,704
[45] Date of Patent: Feb. 4, 1997

[54] SYSTEMS AND METHODS FOR PRIORITIZED ROUTING OF TELEPHONE CALLS TO A SUBSCRIBER

[75] Inventors: Björn G. D. Ahlberg, Falsterbo; Johan Falk, Järfälla, both of Sweden; Anders Mölne, Cary, N.C.

[73] Assignee: Ericsson Inc., Research Triangle Park, N.C.

[21] Appl. No.: 298,406

[22] Filed: Aug. 30, 1994

[51] Int. Cl.$^6$ .......................... H04M 3/42; H04M 11/00
[52] U.S. Cl. .............................. 379/58; 379/201; 379/211
[58] Field of Search ...................................... 379/200, 210, 379/211, 57, 58, 59, 60, 61, 62, 63, 201

[56] References Cited

U.S. PATENT DOCUMENTS

| 4,893,335 | 1/1990 | Fuller et al. | 379/200 |
| 5,153,902 | 10/1992 | Buhl et al. | 379/60 |
| 5,243,645 | 9/1993 | Bissell et al. | 379/211 |
| 5,329,578 | 7/1994 | Brennan et al. | 379/211 |

OTHER PUBLICATIONS

CellularOne "Find Me Now$^{SM}$ Service User Guide", Apr., 1994, pp. 1–8.
Follow Me Now Users Guide. Apr. 1994.

Primary Examiner—Curtis Kuntz
Assistant Examiner—Nay Aung Maung
Attorney, Agent, or Firm—Bell, Seltzer, Park & Gibson

[57] ABSTRACT

A cellular radio communications system maintains a prioritized routing list of several telephone numbers associated with a predetermined subscriber for efficiently establishing a communications link between a calling party and the subscriber. The telephone numbers of the several telephones associated with the subscriber are initially assigned relative priorities such that the telephones are sequentially alerted according to the prioritized routing lists of telephone numbers when a telephone call is placed to the subscriber. The prioritized routing list is subsequently reordered such that the telephone number from which the telephone from which the subscriber responded to the prior alert is assigned the highest priority will be initially alerted in response to the next telephone call placed to the subscriber.

31 Claims, 2 Drawing Sheets

SYSTEMS AND METHODS FOR PRIORITIZED ROUTING OF TELEPHONE CALLS TO A SUBSCRIBER

FIELD OF THE INVENTION

The present invention relates generally to cellular radio communications systems and methods and, more particularly, to systems and methods for efficiently establishing communications in a cellular radio communications system.

BACKGROUND OF THE INVENTION

Cellular radio communications systems are increasingly employed to provide wireless voice and data communications to a number of mobile units or subscribers. Cellular radio communications systems include both analog cellular systems, such as the "AMPS" system, and, more recently, digital cellular systems, such as the pan-European "GSM" system. These systems, and others, are described in a book entitled *Dual Mode Cellular* by Harte, published by P. T. Steiner Publishing Co., Bridgeville, Pa. (1992).

A cellular radio communications system generally includes one or more cellular telephones, one or more radio base stations and a Mobile Telephone Switching Center (MSC). A typical cellular radio communications system can include hundreds of radio base stations, thousands of cellular telephones and one or more MSC's. A cellular radio communications system includes a number of spaced apart radio zones referred to as cells. Each cell includes a radio base station for transmitting and receiving messages to and from cellular telephones which are located within the cell range.

Each cell of the cellular radio communications system typically includes a plurality of duplex voice channels over which cellular telephone messages are carried. Each cell is also provided with a number of control channels to control the operation of the cellular telephones and the assigned voice channels. Accordingly, through the cellular radio communications system, a duplex radio communication signal or link can be established between two cellular telephones or, between the cellular telephone and the wire line telephone.

As used herein, the term "cellular telephone" encompasses a wide variety of portable telephone devices which access a cellular radio communications system. Cellular telephones include mobile telephones that are hand held or of a bag phone variety and permanently mounted car cellular telephones. The term "cellular telephone" also include terminals which provide functions in addition to those of a cellular telephone, such as facsimile, data communications, data processing, word processing applications and other personal communication systems functions. These highly functional cellular telephones are often referred to as "Personal Communication Systems."

Each radio base station generally includes a control unit and an associated antenna. With respect to the cellular telephones located within the cell range, the base station functions chiefly to relay messages to and from the cellular telephones. The radio base station also supervises the quality of the communications link with the cellular telephones. A typical radio base station is Model No. RBS882 manufactured by Ericsson Telecom AB Stockholm, Sweden for the CMS8800 cellular mobile telephone system. A full description of this analog cellular network is provided in Publication No. EN/LZT 101 908 R2B, published by Ericsson Telecom AB.

A number of base stations are connected to a single MSC which acts as the central coordinating element of the cellular system. The MSC includes a cellular processor and a cellular switch connected to the Public Switched Telephone Network (PSTN) to allow communications between the cellular telephones and wire line telephones. The MSC can also be associated with a Home Location Register (HLR). The HLR includes storage means for storing data relating to the subscribers of the cellular system. This data can include the telephone number of the subscriber as well as any specific services requested by the subscriber, such as call waiting or call hold. The HLR can also include processing means for manipulating the stored subscriber data.

A feature node can also be associated with the MSC of a cellular radio communications system or with another associated communications network, such as the PSTN. For example, the feature node can be incorporated within or associated with the HLR. Even if the feature node is associated with another communications network, such as the PSTN, the cellular radio communications network can access the feature node via the interconnection between the MSC of the cellular radio communications system and the PSTN or other communications network.

A feature node provides predetermined functions to the cellular telephones or the telephones associated with the PSTN, such as, for example, establishing an efficient communications link between telephones, such as via intermediate radio base stations, or providing voice-controlled speech information and number translation services as well as facilitating the establishment of conference telephone calls. Still further, a feature node can provide paging services for the user of a cellular telephone and can facilitate the establishment of alternative communications links if the primary communications link is unavailable. A feature node is described, for example, in more detail in U.S. patent application Ser. No. 018,268 entitled "A Method Of Establishing Cooperation With A Functionality" and U.S. patent Application Ser. No. 018,223 entitled "A Method 0f Organizing Communication", both of which were filed on Feb. 16, 1993 and both of which are incorporated herein by reference.

Numerous subscribers or users of a cellular radio communications system have more than one telephone, each of which is typically assigned a different telephone number. For example, cellular radio communications system subscribers typically have a telephone at their place of business (hereinafter referred to as a "work telephone"), a telephone at their residence (hereinafter referred to as a "home telephone") and a cellular telephone. In order to provide parties with the best opportunity to contact the subscriber, the subscriber must generally provide the calling party with the telephone number assigned to each of the different telephones associated with the subscriber. For a subscriber having several telephones, it is undesirable to provide another party with each of the telephone numbers due to the sizeable amount of information which must be accurately exchanged between the subscriber and the calling party. Further, the calling party must record and retain not just one telephone number, but several telephone numbers associated with the subscriber.

Even if each telephone number associated with the subscriber is accurately provided to and recorded by the calling party, the calling party can generally only place a telephone call to the telephone number assigned to one of the subscriber's telephones at a time. Thus, the calling party typically places an initial call to the telephone at which the calling party believes the subscriber is most likely to respond. If the subscriber does not respond to the alert of the telephone which was initially called, the calling party must subsequently try one or more of the remaining telephone numbers assigned to other telephones associated with the subscriber. Accordingly, the calling party must typically place several different telephone calls, each of which require the entry of a different telephone number, in an attempt to reach the subscriber. This process of placing a telephone call to a subscriber is thus not only laborious for the calling party, but is also prone to errors in the recordation and entry of the telephone numbers.

Each telephone call placed to or from a cellular telephone increases the load on the cellular radio communications system with which the cellular telephone is associated. Based upon the components of cellular radio communications system, each system typically has a predetermined maximum allowable load which it is adapted to efficiently accommodate. The operators of the cellular radio communications system, however, do not generally charge a fee for unanswered telephone calls even though such calls increase the system's load. Therefore, the multiple telephone calls which can be placed in an attempt to reach a subscriber who is associated with a plurality of telephones increase the load of the cellular radio communications system without allowing the operator of the cellular radio communications network to charge a fee. Thus, there is a need to provide methods and systems to allow a calling party to efficiently place a call to a subscriber of a cellular radio communications system who is associated with several telephones, each of which has a different telephone number.

SUMMARY OF THE INVENTION

In view of the foregoing background, it is therefore an object of the present invention to provide improved cellular radio communications systems and methods.

It is also an object of the present invention to provide cellular radio communications systems and methods which efficiently route telephone calls to a subscriber.

These and other objects are provided, according to the present invention, by cellular radio communications systems and methods which maintain and sort a prioritized routing list of a plurality of telephone numbers, each of which is assigned to a telephone associated with a predetermined subscriber of a cellular radio communications system, such that telephone calls can efficiently be placed to the predetermined subscriber.

A cellular radio communications system according to the present invention includes a prioritized routing list of the plurality of telephone numbers assigned to the telephones of the predetermined subscriber of the cellular radio communications system. The cellular radio communications system also includes communications link establishing means, responsive to the prioritized routing list, for establishing a communications link between a source telephone placing a telephone call and a telephone associated with the subscriber. The communications link establishing means sequentially alerts the telephones associated with the subscriber according to the prioritized routing list of telephone numbers associated with the subscriber.

Further, the cellular radio communications system of the present invention includes reprioritizing means, responsive to the communications link establishing means, for sorting the prioritized routing list of telephone numbers associated with the subscriber. In particular, the prioritized routing list is sorted such that the telephone from which the subscriber responded to the alert is assigned the highest priority and, accordingly, will be initially alerted by the communications link establishing means in response to the next telephone call placed to a telephone associated with the subscriber.

The prioritized routing list generally includes a listing of telephone numbers ranked from a highest priority to a lowest priority. Consequently, the reprioritizing means typically includes ranking means for designating the telephone number assigned to the telephone from which the subscriber responded to the alert with the highest priority of the prioritized routing list. The ranking means also maintains the relative rankings of the telephone numbers assigned to the other telephones associated with the subscriber from which the subscriber did not respond to the alert. The reprioritizing means can also include telephone number determining means for determining the telephone number assigned to the telephone from which the subscriber responded to the alert.

In one embodiment, the reprioritizing means also includes means for sorting the prioritized routing list of telephone numbers associated with the predetermined subscriber after the subscriber places a telephone call from an associated telephone such that the telephone from which the subscriber placed the telephone call is assigned the highest priority and is initially alerted by said communications link establishing means in response to a next telephone call placed to the predetermined telephone number associated with the subscriber.

The communications link establishing means also generally includes timer means for determining if the subscriber has responded to an alert of a first telephone within a predetermined time period. If the subscriber has not responded to the alert of the first telephone within the predetermined time period, the communications link establishing means can alert a second telephone associated with the subscriber according to the prioritized routing list.

A cellular radio communications system of the present invention can also include a cellular radio network associated with the prioritized routing list, the communications link establishing means and the reprioritizing means. The cellular radio communications system can also include a plurality of cellular telephones responsive to the cellular radio network.

In one embodiment, the cellular radio communications system includes a mobile telephone switching office, responsive to the cellular radio network, for processing and storing data related to the subscribers of the cellular radio network. In this embodiment, the mobile telephone switching office includes the prioritized routing list, the communications link establishing means and the reprioritizing means. In another embodiment, the cellular radio communications system also includes a feature node, responsive to the cellular radio network, for providing predetermined functions to the plurality of cellular telephones. In this embodiment, the feature node includes the prioritized routing list, the communications link establishing means and the reprioritizing means.

Thus, the cellular radio communications systems and methods of the present invention allows telephone calls to be placed to a telephone associated with a predetermined subscriber in an efficient manner. More specifically, the cellular radio communications systems and methods of the present invention sorts the prioritized routing list of telephone numbers associated with the predetermined subscriber following each telephone call to which the subscriber responds. Thus, the telephone from which the subscriber most recently responded will be initially alerted by the next telephone call placed to a telephone associated with the subscriber. The cellular radio communications systems and methods of the present invention therefore increases the efficiency with which telephone calls are routed since only one telephone number need be provided and entered and since the likelihood that the subscriber will respond to the alert of the first telephone is increased, thereby decreasing the time and effort required to establish a communications link.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figures 1, 2A, 2B:
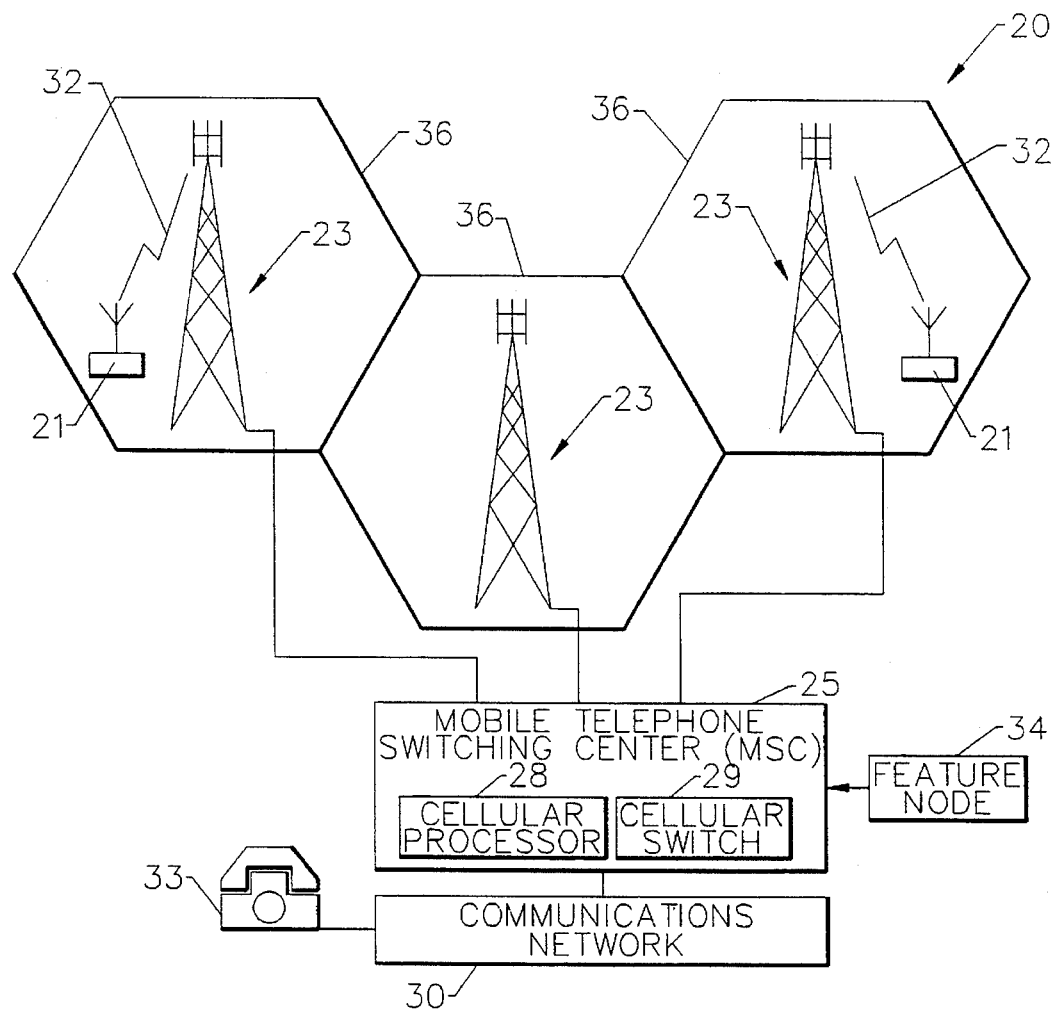
FIG. 1 is a block diagram illustrating the basic components of a cellular radio communications system.
FIGS. 2A and 2B are block diagrams of two embodiments of a prioritized routing list according to the present invention.

Referring now to FIG. 1, a cellular radio communications system 20 is illustrated. The cellular radio communications system 20 includes a plurality of regions or cells 36, each of which is defined by a corresponding radio base station 23. Each radio base station 23 of the cellular radio communications system 20 is connected to a Mobile Telephone Switching Center (MSC) 25 for providing control and other known cellular radio communications system functions. As shown, the MSC typically includes a cellular processor 28 and a cellular switch 29. The cellular switch 29 of the MSC 25 is connected to and provides the interface to other associated communications networks, such as the Public Switched Telephone Network (PSTN) 30. The radio base stations 23 and the MSC 25 generally define the cellular radio network. The design of cellular radio communications systems is well known to those having skill in the art and will therefore not be described further herein. It is noted, however, that the present invention can be used with any cellular system, either analog or digital.

A cellular telephone 21 is also schematically illustrated in FIG. 1. It will be understood that each radio base station 23 is adapted to communicate with the cellular telephones 21 in its cell 36. The other communications networks 30 to which the MSC 25 is connected, such as the PSTN, are also in communication with one or more telephones, such as the wire line telephone 33 illustrated in FIG. 1. Thus, a duplex radio communication signal 32 can be affected through the cellular radio communications system 20 between two cellular telephones 21, or between a cellular telephone and a wire line telephone 33.

The cellular radio communications system of the present invention also includes a prioritized routing list of a plurality of telephone numbers. Each telephone number of the routing list is assigned to a telephone associated with a predetermined subscriber of the cellular radio communications system 20. For example, in addition to a cellular telephone 21, the predetermined subscriber of the cellular radio communications system 20 also generally has a work telephone and a home telephone. The work telephone and the home telephone need not be cellular telephones, but can, instead, be wire line telephones. In addition, each of the telephones associated with the predetermined subscriber is generally assigned a different telephone number.

As shown in FIGS. 2A and 2B, the prioritized routing list 38 includes a listing of the telephone numbers assigned to telephones associated with the predetermined subscriber. The telephone numbers are ranked from a highest priority to a lowest priority. Typically, the subscriber initially assigns the relative priorities to the plurality of associated telephone numbers. Accordingly, the subscriber generally assigns the highest priority to the telephone number assigned to the telephone from which the subscriber is most likely to respond. The subscriber then typically assigns the relative priorities to the remaining telephone numbers such that telephone numbers assigned to telephones from which the subscriber is more likely to respond are assigned higher priorities and telephone numbers assigned to telephones from which the subscriber is less likely to respond are assigned lower priorities.

For example, the predetermined subscriber could have a portable cellular telephone 21 from which the subscriber is most likely to respond, a work telephone and a home telephone from which the subscriber is least likely to respond. As shown in FIG. 2A, the predetermined subscriber can thus assign the highest priority (10) to the telephone number assigned to the portable cellular telephone 21, a medium priority (7) to the telephone number assigned to the work telephone, and the lowest priority (1) to the telephone number assigned to the home telephone. The subscriber can, however, assign priorities to the telephone numbers to any desired manner without departing from the spirit and scope of the present invention. Moreover, automatic initial assignment of the respective priorities can also be provided. In addition, the numerical priority designations (i.e., 1, 7, 10) are for purposes of example and other means of designating the relative priorities of the telephone number associated with the predetermined subscriber can be employed.

The cellular radio communications system also includes communications link establishing means, responsive to the prioritized routing list, for establishing a communications link, such as a duplex radio communications signal 32, between the predetermined subscriber and a source telephone placing a telephone call to a predetermined telephone number associated with the subscriber. The predetermined telephone number associated with the subscriber is typically assigned to the subscriber and is generally different from each of the telephone numbers assigned to the telephones associated with the subscriber. However, the predetermined telephone number can be the same number as that assigned to a cellular telephone of the subscriber.

The communications link establishing means sequentially alerts the telephones associated with the predetermined subscriber according to the prioritized routing list 38 of telephone numbers associated with the subscriber. Thus, the communications link establishing means initially alerts the telephone associated with the subscriber which is assigned the highest priority, such as by creating an audible ringing or buzzing, for example. If the subscriber does not respond to the alert, the communications link establishing means sequentially alerts each telephone associated with the subscriber according to a descending order of priorities such that the telephone assigned the lowest priority is alerted last.

As illustrated in FIG. 2B, two or more telephones can be assigned the same priority without departing from the spirit and scope of the present invention. For example, work telephone 1 and work telephone 2 can be assigned the same priority (10). According to the present invention, telephones which are assigned an identical priority are simultaneously alerted once all telephones having a higher priority have been alerted and no response has been received from the subscriber. If the subscriber does not respond to the alert of either of the telephones having an identical priority, the remaining telephones associated with the subscriber are sequentially alerted according to a descending order of priorities as described above.

This alerting of the telephones according to the prioritized routing list 38 generally continues until either the subscriber responds to an alert or until each telephone associated with the subscriber and listed in the prioritized routing list has been alerted. If the subscriber does not respond following the alerting of each telephone associated with the subscriber and listed in the prioritized routing list 38, a message can be transmitted to the source telephone placing the telephone call to the predetermined telephone number, informing the calling party that the called subscriber is unavailable. Since each telephone listed in the prioritized routing list 38 is sequentially alerted if the subscriber does not respond, the subscriber need only provide and the calling party need only dial the predetermined telephone number assigned to the subscriber and not each telephone number assigned to a telephone associated with the subscriber.

The communications link establishing means can also include timer means for determining if the subscriber has responded to an alert of a first telephone within a predetermined time period. If the subscriber does not respond to the alert of the first telephone within the predetermined time period, the communications link establishing means can then alert a second telephone associated with the subscriber according to the prioritized routing list 38. The subscriber or the system operator typically selects a predetermined time period for which each telephone is alerted. The predetermined time period is preferably selected such that each telephone associated with the subscriber can be alerted without requiring the calling party to wait an inordinate length of time to determine if the subscriber is available.

In one embodiment of the present invention, the communications link establishing means can cease alerting the telephones associated with the subscriber according to the prioritized routing list 38 before the subscriber ever responds and without alerting each associated telephone. The communications link establishing means generally only ceases alerting the telephones before the subscriber responds and without alerting each associated telephone in a limited number of instances which are generally defined or selected by the subscriber in advance. For example, a subscriber who knows that they will not be in the vicinity of one or more of the telephones on the prioritized routing list 38 can instruct the communications link establishing means, typically by entering commands via a keypad associated with one of the telephones, to skip or bypass, i.e., not alert, the one or more telephones which the subscriber will not be near. In a similar fashion, the subscriber can instruct the communications link establishing means to skip all telephones in the prioritized routing list 38 which have a lower priority than a predetermined one of the associated telephones if the subscriber does not respond to the alert of the predetermined telephone.

Alternatively, a subscriber can instruct the communications link to forward all telephone calls placed to a predetermined one of the telephones in the prioritized routing list 38 to another predefined telephone. Thus, instead of alerting the predetermined telephone according to the prioritized routing list 38, the other predefined telephone will be alerted. Therefore, the subscriber can effectively transfer telephone calls from any of the telephones associated with the subscriber to a telephone that is not listed in the prioritized routing list 38, such as the telephone of an acquaintance with whom the subscriber is visiting.

In addition, the communications link establishing means typically ceases alerting the telephones associated with the subscriber before the subscriber responds and without alerting each associated telephone in instances in which a telephone on the prioritized routing list 38 is already in use. In this instance, the communications link establishing means can skip all telephones on the prioritized routing list 38 which have an intermediate priority and can, instead, alert the telephone having the lowest priority which is generally an answering machine. Alternatively, the communications link establishing means can cease alerting any further telephones and can provide the calling party with a message that the subscriber is temporarily unavailable or that the subscriber's telephone is already in service. Thus, the communications link establishing means can more efficiently attempt to alert the subscriber and to establish a communications link with the party placing the telephone call.

The cellular radio communications system of the present invention also includes reprioritizing means, responsive to the communications link establishing means, for sorting the prioritized routing list 38 of telephone numbers associated with the predetermined subscriber. The reprioritizing means sorts the prioritized routing list 38 following each telephone call placed to the subscriber to which the subscriber responds such that the telephone from which the subscriber most recently responded to the alert is assigned the highest priority. Accordingly, the telephone from which the subscriber most recently responded and which is now assigned the highest priority will be initially alerted by the communications link establishing means in response to the next telephone call placed to the predetermined telephone number associated with the subscriber.

The prioritized routing list 38 is updated such that the telephone from which the subscriber has most recently responded to an alert is initially alerted in response to the next telephone call placed to the subscriber. Thus, the calling party will, on average, establish a communications link with the subscriber more rapidly, and therefore more efficiently, according to the present invention since the subscriber is generally more likely to be in the vicinity and to respond to the alert of the telephone from which the subscriber most recently responded.

The reprioritizing means preferably includes telephone number determining means for determining the telephone number assigned to the telephone from which the subscriber responded to the alert. The telephone number determined can then be assigned the highest priority by the reprioritizing means. The reprioritizing means also generally includes ranking means for designating the telephone number assigned to the telephone from which the subscriber most recently responded to an alert with the highest ranking of the prioritized routing list. The ranking means also maintains the relative rankings of the telephone numbers assigned to the other telephones associated with the subscriber and from which the subscriber did not respond to the alert.

For example, in the example described hereinabove in which the subscriber's cellular telephone was initially assigned the highest priority, the subscriber's work telephone was initially assigned a medium priority and the subscriber's home telephone was initially assigned the lowest priority, a telephone call is placed to the predetermined telephone number of the subscriber who responds to an alert at their work telephone. The ranking means will then assign the work telephone the highest priority and will retain the relative rankings of the other telephone such that the cellular telephone will be assigned the medium priority and the home telephone will be assigned the lowest priority.

If the subscriber responds to an alert of one of a plurality of telephones which are assigned an identical priority and which are simultaneously alerted, each of the telephones initially assigned an identical priority can be assigned the same, highest priority. Thus, each of the telephones having the same highest priority will be initially alerted in unison in response to the next telephone call place to the user.

Alternatively, if the subscriber responds to an alert of one of a plurality of telephones which are assigned an identical priority and which are simultaneously alerted, the particular telephone from which the subscriber responded can be reassigned the highest priority and the remaining telephones which were originally assigned the same initial priority can maintain that same priority. Thus, the particular telephone from which the subscriber responded will be the only telephone that is initially alerted in response to the next telephone call placed to the subscriber.

In one embodiment of the present invention, the reprioritizing means includes means 55 for sorting the prioritized routing list 38 following each telephone call placed from a telephone associated with a subscriber. This sorting following each telephone call placed from a telephone associated with the subscriber further increases the efficiency with which the communications link establishing means establishes communications between the subscriber and a calling party since, at the time at which the call was placed, the subscriber was likely to be near the telephone from which the call was placed.

The MSC 25 of one embodiment of the cellular radio communications system 20 can include the prioritized routing list 38, the communications link establishing means and the reprioritizing means. In this embodiment, the predetermined telephone number assigned to the subscriber to which a calling party places a telephone call in order to initiate the system and method of the present invention is maintained within the MSC 25 in association with the prioritized routing list 38 of telephone numbers assigned to telephones associated with the subscriber.

Another embodiment of the cellular radio communications system 20 includes a feature node 34, responsive to the cellular radio network, and associated with the MSC 25. Although not illustrated, the feature node 34 can also be associated with the PSTN or other communications network 30 to provide predetermined functions to both the telephones 33 associated with the PSTN and the cellular telephones 21 associated with the cellular radio communications network 20 via the interface established between the MSC and the associated PSTN. Still further, the feature node 34 can be associated with only predetermined subscribers of a cellular radio communications network 20, such as the plurality of telephones of a business. In this example, the feature node can be embodied in a computer, such as a personal computer, that is communicably connected to the plurality of telephones of the business.

Although the feature node 34 is illustrated as a discrete block in FIG. 1, all or a portion of the feature node 34 can actually be incorporated within the MSC 25 or the Home Location Register (HLR). In addition, while the feature node 34 is shown as a single block in FIG. 1 for purposes of illustration, the feature node 34 can be distributed within the cellular radio communications system 20 without departing from the spirit and scope of the invention. For example, a portion of the feature node 34 can be incorporated within the HLR 25 while the remainder of the feature node 34 can be external to, but associated with, the MSC. Thus, the feature node 34 may not require a dedicated controller, memory and modem (in analog applications), but can instead, share such resources, such as a modem pool, with other components of the cellular radio communications system 20.

As described hereinabove, the feature node 34 provides predetermined functions to the plurality of cellular telephones 21 of the cellular radio communications system 20. In this embodiment of the present invention, the feature node 34 can include the prioritized routing list 38, the communications link establishing means, and the reprioritizing means. Accordingly, the predetermined telephone number assigned to the subscriber to which a calling party places a telephone call in order to initiate the system and method of the present invention is maintained within the feature node 34 in association with the prioritized routing list 38 of telephone numbers assigned to telephones associated with the subscriber.

More specifically, a controller 40, such as a microprocessor, and an associated storage means 42, such as a Random Access Memory (RAM) device of either the MSC 25 or the feature node 34, according to the particular embodiment of the present invention as described herein above, typically include the prioritized routing list 38, communications link establishing means 46 and the reprioritizing means 48. The storage means 42 can be either a discrete memory device associated with the controller 40 or can be the internal memory of the controller.

Figure 3:
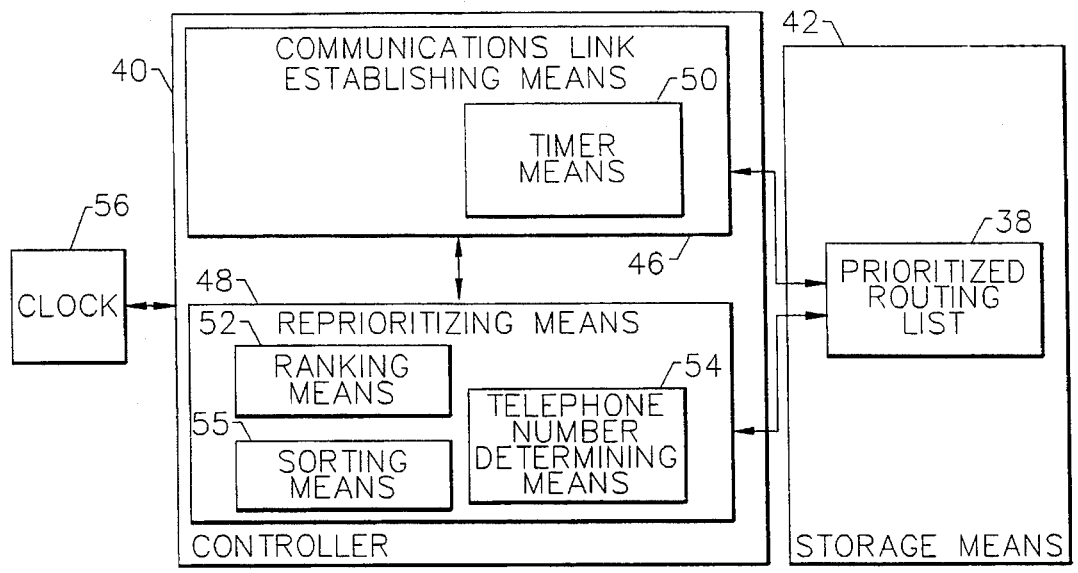
FIG. 3 is a schematic block diagram of controller and associated storage means incorporating the present invention.

As shown in FIG. 3, the controller 40 preferably includes the communications link establishing means 46, including the timer means 50, and the reprioritizing means 48, including the ranking means 52 and the telephone number determining means 54. Likewise, the storage means 42 preferably includes the prioritized routing list 38. As illustrated in FIG. 3, the timer means 50 can include an internal timer of the controller 40. However, the timer means 50 can also include a software routine executed by the controller 40 to perform the timing function on an external timer associated with the controller without departing from the spirit and scope of the present invention. Accordingly, the predetermined telephone numbers associated with a subscriber as well as the prioritized routing list 38 can be retained by the storage means 42. In addition, the associated controller 40 can sort the prioritized routing list 38 following each response by the subscriber to assign the telephone number assigned to the telephone from which the subscriber responded with the highest priority.

The source telephone can, for example, be either another cellular telephone 21 or a wire line telephone 33. In addition, the request for communications is typically a telephone call placed by the calling party from the source telephone. However, the request for communications can also be a request to transmit data, such as a message transmitted to a paging device, a facsimile transmission, an electronic mail message or other types of communications.

Each cellular telephone 21 of a cellular radio communications system 20 need not include or be associated with the prioritized routing list feature since users of cellular telephones which include or are associated with such a feature generally pay an additional fee for the feature. Instead, the cellular radio communications system 20 can be configured such that only predetermined ones of the cellular telephones 21 include or utilize the prioritized routing list feature. Thus, only those subscribers who desire incoming telephone calls to be routed efficiently among a number of telephones associated with the subscriber can select to utilize, and therefore pay for, the feature.

In addition, the user of a cellular telephone 21 who has selected the prioritized routing list feature can subsequently remove this feature if, for example, the user is not frequently utilizing the feature. Alternatively, the user of a cellular telephone 21 who has not initially selected the prioritized routing list feature can subsequently select or add the feature as desired.

Figure 4:
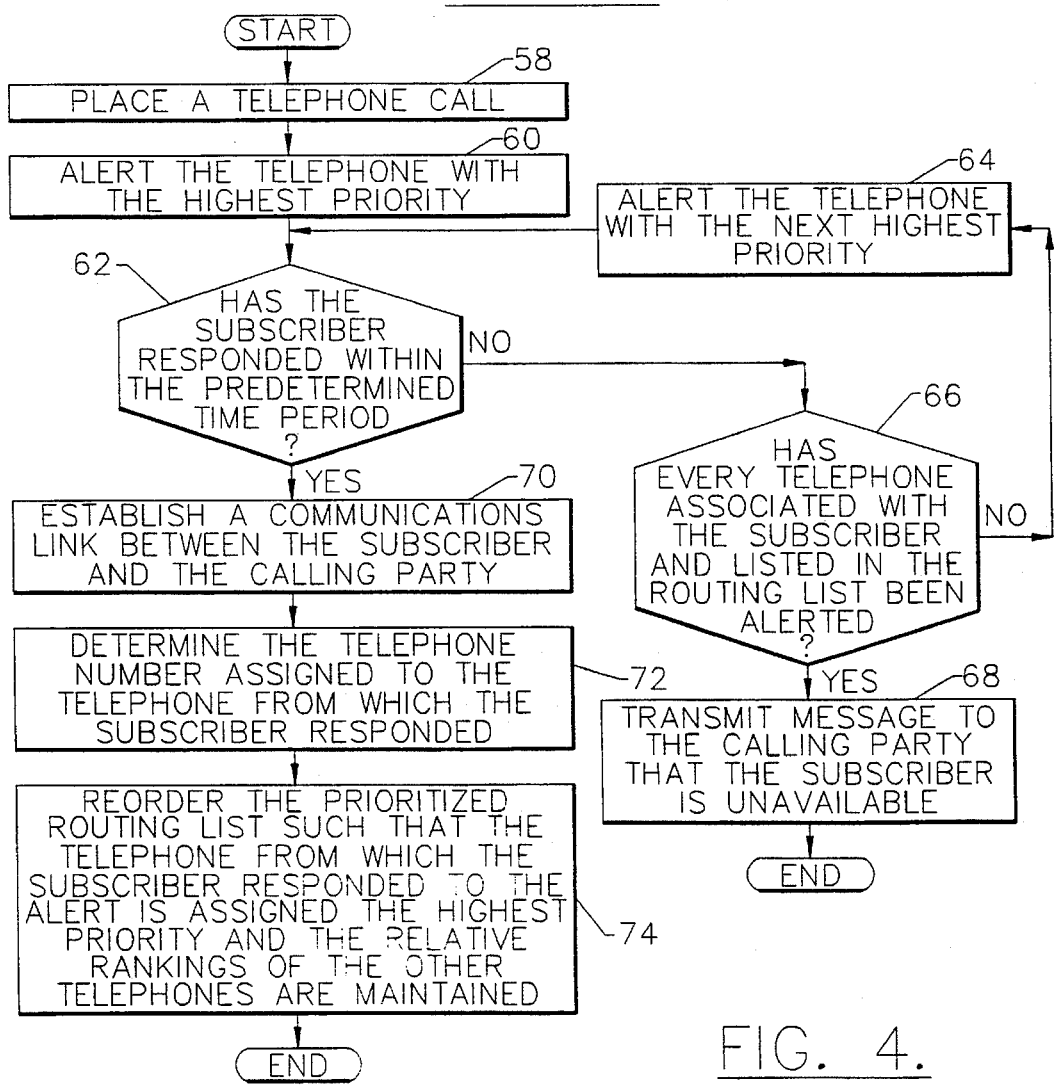
FIG. 4 illustrates detailed operations for maintaining and sorting a prioritized routing list of telephone numbers assigned to telephones associated with a predetermined subscriber according to the present invention.

Referring now to FIG. 4, detailed operations for maintaining and sorting the prioritized routing list 38 of telephone numbers according to the present invention are described. Initially, a communications link is attempted to be established between a source telephone placing a telephone call to the predetermined telephone number associated with the subscriber and the predetermined subscriber, as shown in block 58, by sequentially alerting the telephones associated with the subscriber according to the prioritized routing list 38. In particular, the telephone assigned the highest priority is initially alerted as illustrated in block 60. If the subscriber does not respond to the alert of the first telephone within a predetermined time period, the telephone having the next highest priority in the routing list is alerted as shown in blocks 62 and 64. Each telephone listed in the prioritized routing list 38 is sequentially alerted until either the subscriber responds to the alert or each telephone associated with the subscriber has been alerted and the subscriber has still not responded as shown in block 66. If each telephone has been alerted without a response from the subscriber, a message can be transmitted to the source telephone indicating that the subscriber is presently unavailable as illustrated in block 68.

Alternatively, if the subscriber responds to an alert and a communications link is established, the telephone number assigned to the telephone from which the subscriber responded is determined as shown in blocks 70 and 72. Thereafter, the prioritized routing list 38 is reordered, as illustrated in block 74, such that the telephone from which the subscriber responded to the alert is assigned the highest priority and will, accordingly, be initially alerted by the communications link establishing means in response to the next telephone call placed to the predetermined telephone number associated with the subscriber. In particular, the telephone number assigned to the telephone from which the subscriber responded is designated with the highest priority of the routing list and the relative rankings of the telephone numbers assigned to the other telephones associated with the subscriber and from which the subscriber did not respond are maintained. Alternatively, upon receipt of a next call, the last called telephone can be alerted, followed by sequential routing through the original prioritized routing list.

Accordingly, telephone calls placed to a subscriber who is associated with a plurality of telephones can be efficiently routed based upon not only the preassigned priorities of the telephones, but also upon information relating to the most recent telephone from which the subscriber responded to an alert. On average, a communications link can thus be established between a calling party and the subscriber more rapidly and, therefore, more efficiently.

The prioritized routing list 38 of the present invention can actually include more than one routing list for each subscriber. Therefore, the subscriber can designate different routing lists, either including different telephone numbers or having different priorities assigned to the same telephone numbers, which are effective for different time periods within a day, for example. The cellular radio communications system 20 can thus also include clock means 56, associated with the controller 40, for maintaining a current reference time, such as the time of day and day of the week. Thus, the communications link establishing means can sequentially alert the telephone associated with the subscriber according to the prioritized routing list which was effective at the time that the calling party placed the telephone call.

As an example, a first prioritized routing list can be maintained for a subscriber such that telephone calls placed to the predetermined telephone number associated with the subscriber between the hours of 7:00 a.m. and 6:00 p.m will be routed according to the first routing list. A second prioritized routing list can also be maintained such that telephone calls placed to the predetermined number associated with the subscriber between the hours of 6:00 p.m. and 7:00 a.m. can be routed according to the second routing list. Thus, the subscriber's home telephone can be assigned either a relatively low priority or can be removed altogether from the first prioritized routing list since the subscriber is typically away from their residence during the effective hours of the first routing list. Likewise, the subscriber's work telephone can be either assigned a relatively low priority or can be removed altogether from the second routing list since the subscriber is generally not at their place of business, during the effective hours of the second routing list.

In addition to maintaining multiple prioritized routing lists to each day, the prioritized routing list 38 can include different prioritized routing lists for the different days of the week. For example, different routing lists can be maintained for weekdays and weekends since the subscriber will typically be at their place of business more frequently during the weekdays and their residence more frequently during the weekend. Therefore, the system and method of the present invention can be even more specifically tailored for a subscriber to create even greater efficiencies by using multiple prioritized routing lists for the subscriber.

In the drawings and the specification, there has been set forth preferred embodiments of the invention and, although specific terms are employed, the terms are used in a generic and descriptive sense only and not for purpose of limitation, the scope of the invention being set forth in the following claims.

That which is claimed is:

1. A cellular radio communications system comprising:
   a prioritized routing list of a plurality of telephone numbers wherein each telephone number is assigned to a telephone associated with a predetermined subscriber of the cellular radio communications system;
   communications link establishing means, responsive to said prioritized routing list, for establishing a communications link between a source telephone placing a telephone call and a predetermined telephone number associated with the predetermined subscriber wherein said communications link establishing means sequentially alerts the telephones associated with the predetermined subscriber according to said prioritized routing list of telephone numbers associated with the predetermined subscriber; and reprioritizing means, responsive to said communications link establishing means, for sorting said prioritized routing list of telephone numbers associated with the predetermined subscriber such that the telephone from which the subscriber responded to the alert is assigned the highest priority and is initially alerted by said communications link establishing means in response to a next telephone call placed to the predetermined telephone number associated with the subscriber;

wherein said reprioritizing means comprises means for sorting said prioritized routing list of telephone numbers associated with the predetermined subscriber after the subscriber places a telephone call from an associated telephone such that the telephone from which the subscriber placed the telephone call is assigned the highest priority and is initially alerted by said communications link establishing means in response to a next telephone call placed to the predetermined telephone number associated with the subscriber.

2. A cellular radio communications system according to claim 1 wherein said prioritized routing list of telephone numbers includes a listing of telephone numbers ranked from a highest priority to a lowest priority, and wherein said reprioritizing means comprises ranking means for designating the telephone number assigned to the telephone from which the subscriber responded to the alert with the highest priority of the prioritized routing list and for maintaining the relative rankings of the telephone numbers assigned to the other telephones associated with the subscriber from which the subscriber did not respond to the alert.

3. A cellular radio communications system according to claim 1 wherein said communications link establishing means comprises timer means for determining if the subscriber has responded to an alert of a first telephone associated with the subscriber within a predetermined time period such that said communications link establishing means can alert a second telephone associated with the subscriber according to said prioritized routing list if the subscriber has not responded to the alert of the first telephone.

4. A cellular radio communications system according to claim 1 wherein said reprioritizing means comprises telephone number determining means for determining the telephone number assigned to the telephone from which the subscriber responded to the alert.

5. A cellular radio communications system according to claim 1 further comprising:

a cellular radio network associated with said prioritized routing list, said communications link establishing means and said reprioritizing means; and a plurality of cellular telephones responsive to said cellular radio network.

6. A cellular radio communications system according to claim 5 further comprising a feature node, responsive to said cellular radio network, for providing predetermined functions to said plurality of cellular telephones.

7. A cellular radio communications system according to claim 6 wherein said feature node includes said prioritized routing list, said communications link establishing means and said reprioritizing means.

8. A cellular radio communications system according to claim 5 further comprising a mobile switching center, responsive to said cellular radio network, for processing and storing data related to the subscribers of said cellular radio network.

9. A cellular radio communications system according to claim 8 wherein said mobile switching center includes said prioritized routing list, said communications link establishing means and said reprioritizing means.

10. A cellular radio communications system according to claim 1 further comprising:

a plurality of prioritized routing lists, each prioritized routing list including a listing of a plurality of telephone numbers assigned to telephones associated with the predetermined subscriber, each prioritized routing list also associated with a predetermined time period during which the prioritized routing list is effective; and clock means for maintaining a current reference time;

wherein said communications link establishing means is responsive to both said plurality of prioritized routing lists and said clock means such that the telephones are sequentially alerted according to the prioritized routing list which is effective at the time at which the source telephone placed the telephone call.

11. A mobile telephone switching office of a cellular radio communications system for processing and storing data related to the subscribers of the cellular radio communications system, the telephone mobile switching office comprising:

a prioritized routing list of a plurality of telephone numbers wherein each telephone number is assigned to a telephone associated with a predetermined subscriber of said cellular radio communications system;

communications link establishing means, responsive to said prioritized routing list, for establishing a communications link between a source telephone placing a telephone call and a predetermined telephone number associated with the predetermined subscriber wherein said communications link establishing means sequentially alerts the telephones associated with the predetermined subscriber according to said prioritized routing list of telephone numbers associated with the predetermined subscriber; and reprioritizing means, responsive to said communications link establishing means, for sorting said prioritized routing list of telephone numbers associated with the predetermined subscriber such that the telephone from which the subscriber responded to the alert is assigned the highest priority and is initially alerted by said communications link establishing means in response to a next telephone call placed to the predetermined telephone number associated with the subscriber;

wherein said reprioritizing means comprises means for sorting said prioritized routing list of telephone numbers associated with the predetermined subscriber after the subscriber places a telephone call from an associated telephone such that the telephone from which the subscriber placed the telephone call is assigned the highest priority and is initially alerted by said communications link establishing means in response to a next telephone call placed to the predetermined telephone number associated with the subscriber.

12. A mobile telephone switching office according to claim 11 wherein said prioritized routing list of telephone numbers includes a listing of telephone numbers ranked from a highest priority to a lowest priority, and wherein said reprioritizing means comprises ranking means for designating the telephone number assigned to the telephone from which the subscriber responded to the alert with the highest priority of the prioritized routing list and for maintaining the relative rankings of the telephone numbers assigned to the other telephones associated with the subscriber from which the subscriber did not respond to the alert.

13. A mobile telephone switching office according to claim 11 wherein said communications link establishing means comprises timer means for determining if the subscriber has responded to an alert of a first telephone associated with the subscriber within a predetermined time period such that said communications link establishing means can alert a second telephone associated with the subscriber according to said prioritized routing list if the subscriber has not responded to the alert of the first telephone.

14. A mobile telephone switching office according to claim 11 further comprising:

a plurality of prioritized routing lists, each prioritized routing list including a listing of a plurality of telephone numbers assigned to telephones associated with the predetermined subscriber, each prioritized routing list also associated with a predetermined time period during which the prioritized routing list is effective; and clock means for maintaining a current reference time;

wherein said communications link establishing means is responsive to both said plurality of prioritized routing lists and said clock means such that the telephones are sequentially alerted according to the prioritized routing list which is effective at the time at which the source telephone placed the telephone call.

15. A feature node for providing predetermined functions to a plurality of cellular telephones of a cellular radio communications system, the feature node comprising:

a prioritized routing list of a plurality of telephone numbers wherein each telephone number is assigned to a telephone associated with a predetermined subscriber of said cellular radio communications system;

communications link establishing means, responsive to said prioritized routing list, for establishing a communications link between a source telephone placing a telephone call and a predetermined telephone number associated with the predetermined subscriber wherein said communications link establishing means sequentially alerts the telephones associated with the predetermined subscriber according to said prioritized routing list of telephone numbers associated with the predetermined subscriber; and reprioritizing means, responsive to said communications link establishing means, for sorting said prioritized routing list of telephone numbers associated with the predetermined subscriber such that the telephone from which the subscriber responded to the alert is assigned the highest priority and is initially alerted by said communications link establishing means in response to a next telephone call placed to the predetermined telephone number associated with the subscriber;

wherein said reprioritizing means comprises means for sorting said prioritized routing list of telephone numbers associated with the predetermined subscriber after the subscriber places a telephone call from an associated telephone such that the telephone from which the subscriber placed the telephone call is assigned the highest priority and is initially alerted by said communications link establishing means in response to a next telephone call placed to the predetermined telephone number associated with the subscriber.

16. A feature node according to claim 15 wherein said prioritized routing list of telephone numbers includes a listing of telephone numbers ranked from a highest priority to a lowest priority, and wherein said reprioritizing means comprises ranking means for designating the telephone number assigned to the telephone from which the subscriber responded to the alert with the highest priority of said prioritized routing list and for maintaining the relative rankings of the telephone numbers assigned to the other telephones associated with the subscriber from which the subscriber did not respond to the alert.

17. A feature node according to claim 15 wherein said communications link establishing means comprises timer means for determining if the subscriber has responded to an alert of a first telephone associated with the subscriber within a predetermined time period such that said communications link establishing means can alert a second telephone associated with the subscriber according to said prioritized routing list if the subscriber has not responded to the alert of the first telephone.

18. A feature node according to claim 15 further comprising:

a plurality of prioritized routing lists, each prioritized routing list including a listing of a plurality of telephone numbers assigned to telephones associated with the predetermined subscriber, each prioritized routing list also associated with a predetermined time period during which the prioritized routing list is effective; and clock means for maintaining a current reference time;

wherein said communications link establishing means is responsive to both said plurality of prioritized routing lists and said clock means such that the telephones are sequentially alerted according to the prioritized routing list which is effective at the time at which the source telephone placed the telephone call.

19. A method of sorting a prioritized routing list of telephone numbers assigned to a plurality of telephones associated with a predetermined subscriber of a cellular radio communications system, the method comprising the steps of:

sequentially alerting the telephones associated with the predetermined subscriber according to the prioritized routing list of telephone numbers associated with the predetermined subscriber; and reordering the prioritized routing list of telephone numbers associated with the predetermined subscriber such that the telephone number of the telephone from which the subscriber responded to the alert is assigned the highest priority and will be initially alerted in response to the next telephone call placed to the predetermined telephone number associated with the subscriber;

wherein the prioritized routing list of telephone numbers includes a listing of telephone numbers ranked from a highest priority to a lowest priority, and wherein said reordering step comprises the step of designating the telephone number of a telephone associated with the subscriber from which the subscriber placed a telephone call with the highest priority and maintaining the relative rankings of the telephone numbers assigned to the other telephones associated with the subscriber from which the subscriber did not place the telephone call.

20. A method for sorting a prioritized routing list of telephone numbers according to claim 19 wherein the prioritized routing list of telephone numbers includes a listing of telephone numbers ranked from a highest priority to a lowest priority, and wherein said reordering step comprises the steps of designating the telephone number assigned to the telephone from which the subscriber responded to the alert with the highest priority of the prioritized routing list and maintaining the relative rankings of the telephone numbers assigned to the other telephones associated with the subscriber from which the subscriber did not respond to the alert.

21. A method for sorting a prioritized routing list of telephone number according to claim 19 further comprising the step of establishing a communications link between a source telephone placing a telephone call and a predetermined telephone number associated with the predetermined subscriber and the predetermined subscriber when the subscriber responds to an alert of an associated telephone.

22. A method for sorting a prioritized routing list of telephone numbers according to claim 19 wherein said step of establishing a communications link comprises the steps of:
   determining if the subscriber has responded to an alert of a first telephone associated with the subscriber within a predetermined time period; and
   if the subscriber has not responded to the alert of the first telephone, alerting a second telephone associated with the subscriber according to the prioritized routing list.

23. A method for sorting a prioritized routing list of telephone numbers according to claim 19 wherein the cellular radio communications system includes a plurality of prioritized routing lists, each prioritized routing list including a listing of a plurality of telephone numbers assigned to telephones associated with the predetermined subscriber, each prioritized routing list also associated with a predetermined time period during which the prioritized routing list is effective, the method further comprising the step of maintaining a current reference time.

24. A method for sorting a prioritized routing list of telephone numbers according to claim 23 wherein said sequential alerting step comprises the steps of:
   determining the prioritized routing list which is effective at the time a telephone call was placed to the predetermined subscriber; and
   sequentially alerting the telephone associated with the predetermined subscriber according to the effective prioritized routing list.

25. A method for sorting a prioritized routing list of telephone numbers according to claim 19 further comprising the step of determining the telephone number assigned to the telephone from which the subscriber responded to the alert.

26. A cellular radio communications system comprising:
   a prioritized routing list of a plurality of telephone numbers wherein each telephone number is assigned to a telephone associated with a predetermined subscriber of the cellular radio communications system;
   communications link establishing means, responsive to said prioritized routing list, for establishing a communications link between a source telephone placing a telephone call and a predetermined one of said assigned telephone numbers wherein said communications link establishing means sequentially alerts the telephones associated with the predetermined subscriber according to said prioritized routing list of telephone numbers associated with the predetermined subscriber; and
   reprioritizing means, responsive to said communications link establishing means, for sorting said prioritized routing list of telephone numbers associated with the predetermined subscriber such that the telephone from which the subscriber responded to the alert is assigned the highest priority and is initially alerted by said communications link establishing means in response to a next telephone call placed to the predetermined telephone number associated with the subscriber.

27. A cellular radio communications system according to claim 26 wherein said predetermined assigned telephone number is assigned to a cellular radiotelephone assigned to the predetermined subscriber.

28. A mobile telephone switching office of a cellular radio communications system for processing and storing data related to the subscribers of the cellular radio communications system, the telephone mobile switching office comprising:
   a prioritized routing list of a plurality of telephone numbers wherein each telephone number is assigned to a telephone associated with a predetermined subscriber of said cellular radio communications system;
   communications link establishing means, responsive to said prioritized routing list, for establishing a communications link between a source telephone placing a telephone call and a predetermined one of said assigned telephone numbers wherein said communications link establishing means sequentially alerts the telephones associated with the predetermined subscriber according to said prioritized routing list of telephone numbers associated with the predetermined subscriber; and
   reprioritizing means, responsive to said communications link establishing means, for sorting said prioritized routing list of telephone numbers associated with the predetermined subscriber such that the telephone from which the subscriber responded to the alert is assigned the highest priority and is initially alerted by said communications link establishing means in response to a next telephone call placed to the predetermined telephone number associated with the subscriber.

29. A mobile telephone switching office according to claim 28 wherein said predetermined assigned telephone number is assigned to a cellular radiotelephone assigned to the predetermined subscriber.

30. A feature node for providing predetermined functions to a plurality of cellular telephones of a cellular radio communications system, the feature node comprising:
   a prioritized routing list of a plurality of telephone numbers wherein each telephone number is assigned to a telephone associated with a predetermined subscriber of said cellular radio communications system;
   communications link establishing means, responsive to said prioritized routing list, for establishing a communications link between a source telephone placing a telephone call and a predetermined one of said assigned telephone numbers wherein said communications link establishing means sequentially alerts the telephones associated with the predetermined subscriber according to said prioritized routing list of telephone numbers associated with the predetermined subscriber; and
   reprioritizing means, responsive to said communications link establishing means, for sorting said prioritized routing list of telephone numbers associated with the predetermined subscriber such that the telephone from which the subscriber responded to the alert is assigned the highest priority and is initially alerted by said communications link establishing means in response to a next telephone call placed to the predetermined telephone number associated with the subscriber.

31. A feature node according to claim 30 wherein said predetermined assigned telephone number is assigned to a cellular radiotelephone assigned to the predetermined subscriber.

* * * * *